United States Patent
Kubota et al.

(10) Patent No.: US 8,924,123 B2
(45) Date of Patent: Dec. 30, 2014

(54) INTERNAL COMBUSTION ENGINE BOOST PRESSURE DIAGNOSTIC APPARATUS

(75) Inventors: Mitsuhiko Kubota, Sagamihara (JP); Masahiro Arai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/346,454

(22) Filed: Jan. 9, 2012

(65) Prior Publication Data
US 2012/0191319 A1 Jul. 26, 2012

(30) Foreign Application Priority Data

Jan. 24, 2011 (JP) ................................. 2011-011549

(51) Int. Cl.
| | | |
|---|---|---|
| G01M 15/04 | (2006.01) | |
| F02D 41/22 | (2006.01) | |
| F02B 33/36 | (2006.01) | |
| F02B 39/12 | (2006.01) | |
| F02D 23/02 | (2006.01) | |
| F02D 41/00 | (2006.01) | |
| F02M 35/10 | (2006.01) | |

(52) U.S. Cl.
CPC .............. *F02D 41/221* (2013.01); *F02B 33/36* (2013.01); *F02B 39/12* (2013.01);
(Continued)

(58) Field of Classification Search
CPC .......... F02B 33/36; F02B 39/12; F02D 23/02; F02D 41/0007; F02D 41/221; F02D 41/222; F02D 2041/228; F02D 2200/0404; F02D 2200/0406; F02D 2200/101; F02D 2200/503; F02D 2400/08; F02M 35/10163
See application file for complete search history.

(56) References Cited

U.S. PATENT DOCUMENTS

| | | | | |
|---|---|---|---|---|
| 4,425,762 A | * | 1/1984 | Wakamatsu et al. | ............ 60/646 |
| 4,530,339 A | * | 7/1985 | Oguma et al. | ................ 123/561 |

(Continued)

FOREIGN PATENT DOCUMENTS

| | | |
|---|---|---|
| CN | 101761403 A | 6/2010 |
| DE | 102008054514 A1 | 6/2010 |

(Continued)

OTHER PUBLICATIONS

An English translation of the Chinese Office Action for the corresponding Chinese patent application No. 201210015267.9 issued on Jan. 6, 2014.

(Continued)

*Primary Examiner* — John R Olszewski
*Assistant Examiner* — Jean-Paul Cass
(74) *Attorney, Agent, or Firm* — Global IP Counselors, LLP (57) ABSTRACT

An internal combustion engine boost pressure diagnostic apparatus includes a boost pressure sensor, a throttle valve opening degree sensor, a bypass valve opening degree sensor and a control unit. The boost pressure sensor detects a pressure between a forced induction device and a throttle valve. The throttle valve opening degree sensor detects a throttle valve opening degree of the throttle valve. The bypass valve opening degree sensor detects a valve opening degree of a bypass valve. The control unit determines that the pressure between the forced induction device and the throttle valve is abnormal upon the boost pressure sensor detecting the pressure being equal to or larger than a prescribed value, the throttle valve opening degree sensor detecting the throttle valve opening degree being in a prescribed opening degree region, and the bypass valve opening degree sensor detecting the bypass valve opening degree being in a prescribed opening degree region.

14 Claims, 4 Drawing Sheets

(52) U.S. Cl.
CPC ........... *F02D 23/02* (2013.01); *F02D 41/0007* (2013.01); *F02D 41/222* (2013.01); *F02M 35/10163* (2013.01); *F02D 2041/228* (2013.01); *F02D 2200/0404* (2013.01); *F02D 2200/0406* (2013.01); *F02D 2200/101* (2013.01); *F02D 2200/503* (2013.01); *F02D 2400/08* (2013.01); *Y02T 10/40* (2013.01); *Y02T 10/144* (2013.01)
USPC .......................................................... 701/99

(56) References Cited

U.S. PATENT DOCUMENTS

| | | | | |
|---|---|---|---|---|
| 4,556,038 | A * | 12/1985 | Okamoto et al. | 123/564 |
| 4,589,396 | A * | 5/1986 | Tokushima et al. | 123/559.3 |
| 4,750,352 | A * | 6/1988 | Kolhoff | 73/114.33 |
| 5,154,057 | A * | 10/1992 | Yoshioka et al. | 60/612 |
| 5,154,155 | A * | 10/1992 | Ohnaka et al. | 123/564 |
| 5,261,236 | A * | 11/1993 | Ironside et al. | 60/600 |
| 5,269,144 | A * | 12/1993 | Miller et al. | 60/609 |
| 5,355,677 | A * | 10/1994 | Hawkins et al. | 60/609 |
| 5,454,360 | A * | 10/1995 | Shimizu et al. | 123/564 |
| 5,477,840 | A * | 12/1995 | Neumann | 123/564 |
| 5,551,235 | A * | 9/1996 | Entenmann et al. | 60/602 |
| 5,823,160 | A * | 10/1998 | Oda et al. | 123/295 |
| 5,832,893 | A * | 11/1998 | Kamura et al. | 123/305 |
| 5,937,821 | A * | 8/1999 | Oda et al. | 123/295 |
| 5,960,765 | A * | 10/1999 | Iida et al. | 123/295 |
| 6,020,652 | A * | 2/2000 | Daudel et al. | 290/45 |
| 6,055,811 | A * | 5/2000 | Maddock et al. | 60/602 |
| 6,134,888 | A * | 10/2000 | Zimmer et al. | 60/600 |
| 6,253,551 | B1 * | 7/2001 | Lohmann et al. | 60/602 |
| 6,279,551 | B1 * | 8/2001 | Iwano et al. | 123/564 |
| 6,293,267 | B1 * | 9/2001 | Smith et al. | 123/568.22 |
| 6,634,344 | B2 * | 10/2003 | Stretch | 123/559.3 |
| 6,675,769 | B2 * | 1/2004 | Yip et al. | 123/350 |
| 6,907,867 | B2 * | 6/2005 | Igarashi et al. | 123/565 |
| 6,996,970 | B2 * | 2/2006 | Lorenz | 60/39.281 |
| 7,231,899 | B2 * | 6/2007 | Wakamori et al. | 123/184.21 |
| 7,267,099 | B2 * | 9/2007 | Takahashi et al. | 123/336 |
| 7,383,814 | B2 * | 6/2008 | Takahashi et al. | 123/336 |
| 7,614,229 | B2 * | 11/2009 | Irisawa et al. | 60/602 |
| 7,677,227 | B2 * | 3/2010 | Sagisaka et al. | 123/559.1 |
| 8,161,743 | B2 * | 4/2012 | Okamura | 60/599 |
| 8,353,198 | B2 * | 1/2013 | Burkhardt et al. | 73/47 |
| 8,522,551 | B2 | 9/2013 | Tomita et al. | |
| 2002/0189590 | A1 * | 12/2002 | Nakagawa et al. | 123/480 |
| 2005/0024223 | A1 | 2/2005 | Katrak et al. | |
| 2005/0066649 | A1 * | 3/2005 | Lorenz | 60/39.281 |
| 2006/0248889 | A1 * | 11/2006 | Sagisaka et al. | 60/602 |
| 2006/0254561 | A1 * | 11/2006 | Wakamori et al. | 123/336 |
| 2006/0260586 | A1 * | 11/2006 | Takahashi et al. | 123/336 |
| 2009/0101121 | A1 * | 4/2009 | Okamura | 123/564 |
| 2009/0114003 | A1 | 5/2009 | Wegener et al. | |
| 2009/0292436 | A1 * | 11/2009 | D'Amato et al. | 701/100 |
| 2010/0146966 | A1 * | 6/2010 | Burkhardt et al. | 60/602 |
| 2010/0229828 | A1 | 9/2010 | Bauerle et al. | |
| 2011/0005223 | A1 | 1/2011 | Kawabe et al. | |
| 2013/0282256 | A1 * | 10/2013 | Watanuki et al. | 701/102 |

FOREIGN PATENT DOCUMENTS

| | | | |
|---|---|---|---|
| EP | 0524667 B1 * | 6/1991 | |
| EP | 1347162 A1 * | 9/2003 | ............. F02D 33/00 |
| EP | 1391595 A1 | 2/2004 | |
| JP | 2007-077897 | 3/2007 | |
| WO | WO02/44541 * | 6/2002 | |
| WO | 2011007456 A1 | 1/2011 | |

OTHER PUBLICATIONS

Extended European Search Report for the corresponding European patent application No. 11195665.2 issued on Jul. 14, 2014.

* cited by examiner

INTERNAL COMBUSTION ENGINE BOOST PRESSURE DIAGNOSTIC APPARATUS

CROSS-REFERENCE TO RELATED APPLICATIONS

This application claims priority to Japanese Patent Application No. 2011-011549, filed on Jan. 24, 2011. The entire disclosure of Japanese Patent Application No. 2011-011549 is hereby incorporated herein by reference.

BACKGROUND

1. Field of the Invention

The present invention generally relates to a boost pressure diagnostic apparatus for an internal combustion engine equipped with a forced induction device. More specifically, the present invention relates a boost pressure diagnostic apparatus that determines if a boost pressure is abnormal in an internal combustion engine equipped with a forced induction device.

2. Background Information

Japanese Laid-Open Patent Application Publication No. 2007-77897, for example, discloses an apparatus comprising a throttle valve, a forced induction device provided on upstream the throttle valve, a bypass valve provided in a passage arranged to circumvent the forced induction device, and a boost pressure sensor configured to detect a pressure upstream of the throttle valve. The apparatus is configured to determine that an abnormality exists in the bypass valve when the pressure upstream of the throttle valve is larger than a preset pressure determination value and has remained larger than the preset pressure determination value continuously for a prescribed amount of time after the bypass valve was opened.

SUMMARY

It has been discovered that with the apparatus disclosed in the above mentioned Japanese patent publication, a determination regarding the pressure upstream of the throttle valve is made based solely on a detection value of the boost pressure sensor even if the detection value of the boost pressure sensor includes noise. Consequently, there is a possibility that an incorrect pressure determination value will occur due to the detection value of the boost pressure sensor containing noise such that the pressure upstream of the throttle valve will exceed the pressure determination value.

In view of the state of the known technology, one aspect presented in the present disclosure is to provide a boost pressure diagnostic apparatus for an internal combustion engine according that determines a pressure between a forced induction device and a throttle valve is abnormal when a pressure detected by a boost pressure sensor detects a pressure between the forced induction device and the throttle valve that is equal to or larger than a prescribed value and each of an opening degree of the throttle valve and an opening degree of a bypass valve provided in a bypass passage allows intake air to circumvent the forced induction device is in a prescribed opening degree region.

Another aspect presented in the present disclosure is to provide an internal combustion engine boost pressure diagnostic apparatus that basically comprises a boost pressure sensor, a throttle valve opening degree sensor, a bypass valve opening degree sensor and a control unit. The boost pressure sensor detects a pressure between a forced induction device and a throttle valve. The throttle valve opening degree sensor detects a throttle valve opening degree of the throttle valve. The bypass valve opening degree sensor detects a valve opening degree of a bypass valve. The control unit determines that the pressure between the forced induction device and the throttle valve is abnormal upon the boost pressure sensor detecting the pressure being equal to or larger than a prescribed value, the throttle valve opening degree sensor detecting the throttle valve opening degree being in a prescribed throttle valve opening degree region, and the bypass valve opening degree sensor detecting the bypass valve opening degree being in a prescribed bypass valve opening degree region.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
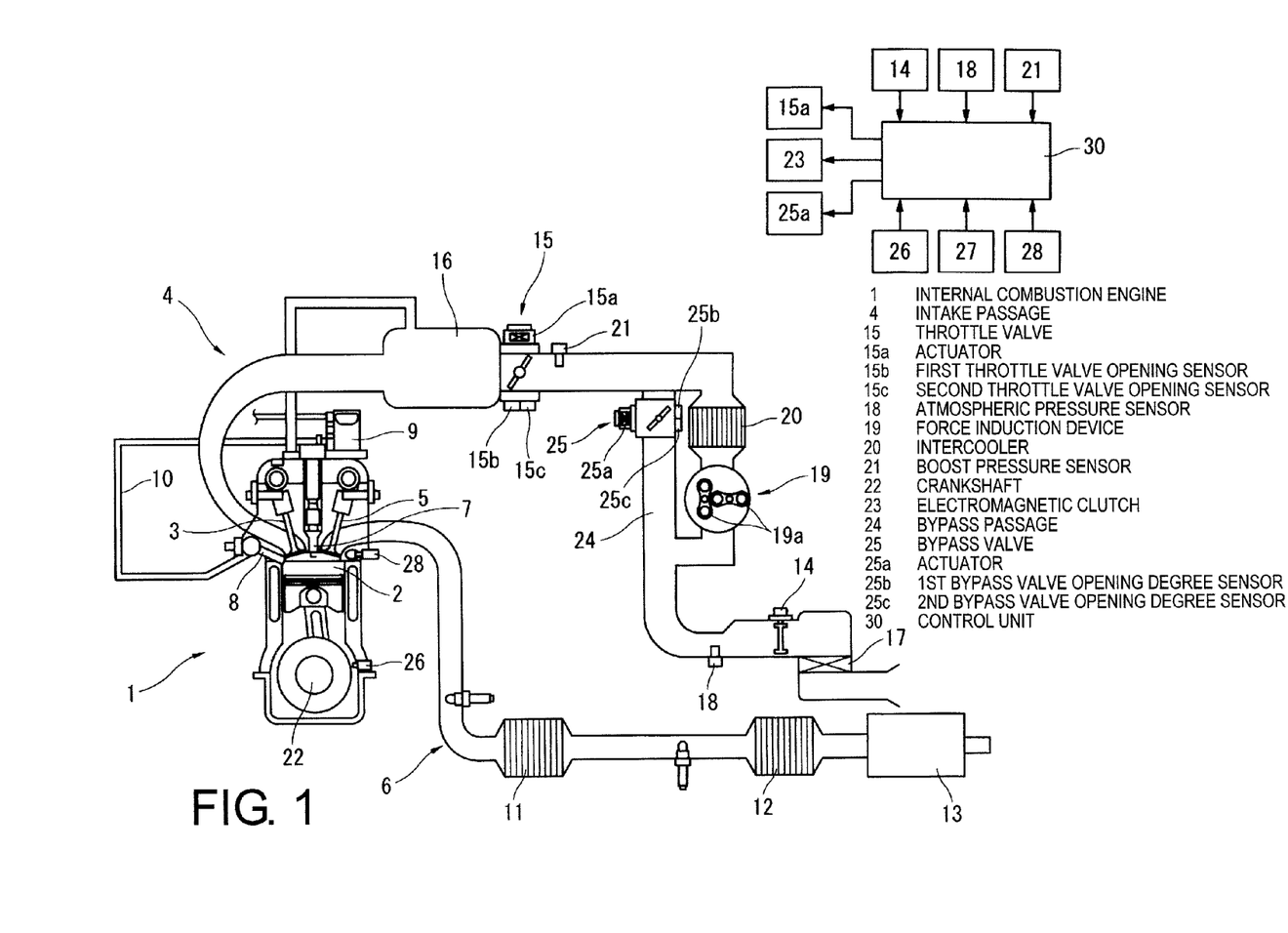
FIG. 1 is a simplified schematic of an internal combustion engine equipped with a boost pressure diagnostic apparatus in accordance with one illustrative embodiment.

Referring initially to FIG. 1, an internal combustion engine 1 is schematically is illustrated with a boost pressure diagnostic apparatus in accordance with one illustrative embodiment. In the illustrated embodiment, the internal combustion engine 1 is installed in a passenger vehicle. The internal combustion engine 1 includes a plurality of combustion chambers 2. In most case, the internal combustion engine 1 for a passenger vehicle has four or more cylinders that define four or more combustion chambers. For the sake of brevity, only one of the combustion chambers 2 and the associated structures will be discussed and illustrated herein.

As shown in FIG. 1, the internal combustion engine 1 includes at least one intake valve 3 for regulating intake air flow into the combustion chamber 2 from an intake passage 4. The intake passage 4 is connected to the internal combustion engine 1 for supplying intake air into the combustion chamber 2 through an intake port that is selectively opened and closed by the intake valve 3. The internal combustion engine 1 further includes at least one exhaust valve 5 for regulating exhaust air flowing out from the combustion chamber 2. The internal combustion engine 1 further includes an exhaust passage 6 that is connected to the combustion chamber 2 through an exhaust port that is selectively opened and closed by the exhaust valve 5. Typically, a spark plug 7 is arranged in a central upper section of the combustion chamber 2. A fuel injection valve 8 is often arranged on a side portion of the combustion chamber 2 that is located closer to the intake valve 3. In the illustrated embodiment, the fuel injection valve 8 injects fuel directly into the combustion chamber 2. Fuel supplied to the fuel injection valve 8 has been regulated to a prescribe pressure by a high-pressure fuel pump 9 or the like. The fuel is delivered through a high-pressure fuel passage 10.

Also in the illustrated embodiment, as shown in FIG. 1, the exhaust system of the internal combustion engine 1 includes a first or primary catalytic converter 11, a second or secondary catalytic converter 12 and a muffler 13. The catalytic converters 11 and 12 and the muffler 13 are provided in the exhaust passage 6 in order as mentioned from upstream to downstream.

Also in the illustrated embodiment, the intake passage 4 is provided with an air flow meter 14 and a throttle valve 15. The air flow meter 14 is configured to detect an intake air flow rate. The throttle valve 15 is arranged in a position downstream of the air flow meter 14 for controlling the intake air flow rate of the intake air flowing in the intake passage 4 to the combustion chamber 2.

Also as shown in FIG. 1, an intake air collector 16 is positioned downstream of the throttle valve 15, and an air cleaner 17 is positioned upstream of the air flow meter 14. The throttle valve 15 is provided with an actuator 15a that includes an electric motor. In the illustrated embodiment, a valve opening degree (throttle valve opening degree) of the throttle valve 15 is detected by two throttle valve opening degree sensors 15b and 15c installed inside the throttle valve 15. The actuator 15a controls the throttle valve 15 to a target throttle valve opening degree in accordance with a control signal issued from a control unit 30. That is, in the illustrated embodiment, the boost pressure diagnostic apparatus can determine if a detected throttle valve opening degree is a correct detection of an actual throttle valve opening degree by detecting the throttle valve opening degree with the throttle valve opening degree sensors 15b and 15c. For example, if there is a large difference between a throttle valve opening degree value detected by the first throttle valve opening degree sensor 15b and a throttle valve opening degree value detected by the second throttle valve opening degree sensor 15c, then the apparatus can determine that one of the two throttle valve opening degree sensors 15b or 15c is malfunctioning.

The intake air system of the internal combustion engine 1 is also provided with an atmospheric pressure sensor 18, a forced induction (boost pressure) device 19, an intercooler 20 and a boost pressure sensor 21 in the intake passage 4. The atmospheric pressure sensor 18, the forced induction device 19, the intercooler 20 and the boost pressure sensor 21 are arranged between the air flow meter 14 and the throttle valve 15 in order as listed from upstream to downstream. The boost pressure diagnostic apparatus is configured to accurately determine if a pressure between the forced induction device 19 and the throttle valve 15 is abnormal as discussed below.

The atmospheric pressure sensor 18 is positioned upstream of the forced induction device 19 and detects an atmospheric pressure, and the boost pressure sensor 21 is positioned downstream of the forced induction device 19 and detects a pressure (boost pressure) on an upstream side of the throttle valve 15. In the illustrated embodiment, the forced induction device 19 is a mechanical forced induction device (e.g., a so-called "supercharger") driven by a crankshaft 22 of the engine 1. The forced induction device 19 is equipped with an electromagnetic clutch 23. The electromagnetic clutch 23 is configured to connect and disconnect a drive force from the crankshaft 22 to the forced induction device 19 in accordance with a control signal issued from the control unit 30. The electromagnetic clutch 23 is configured to be engaged (connected) and released (disconnected) in accordance with one or more operating conditions that are inputted to the control unit 30. When the electromagnetic clutch 23 is engaged (connected), a drive force from the crankshaft 22 rotates a rotor 19a of the forced induction device 19 and pumps intake air downstream. When the electromagnetic clutch 23 is released (disconnected), a drive force is not transmitted from the crankshaft 22 and the rotor 19a of the forced induction device 19 does not rotate.

The intake air system of the internal combustion engine 1 is also provided with a bypass passage 24. The bypass passage 24 is connected to the intake passage 4 and arranged to allow intake air to circumvent (bypass) the forced induction device 19 and the intercooler 20. The bypass passage 24 is arranged parallel to the forced induction device 19 and the intercooler 20 such that one end is connected to the intake passage 4 downstream of the intercooler 20 and the other end is connected to the intake passage 4 upstream of the forced induction device 19. A bypass valve 25 is arranged in the bypass passage 24.

The bypass valve 25 has an actuator 25a comprising an electric motor. The bypass valve 25 is configured to be controlled to a target bypass valve opening degree by driving the actuator 25a in accordance with a control signal issued from the control unit 30. The bypass valve 25 is configured to employ an elastic force of a spring such that the valve opening degree (bypass valve opening degree) of the bypass valve 25 is fully open when electric power is not supplied to the actuator 25a from an onboard battery (not shown).

In this embodiment, the bypass valve opening degree is detected by the two bypass valve opening degree sensors 25b and 25c installed inside the bypass valve 25. That is, in this embodiment, the boost pressure diagnostic apparatus can determine if a detected bypass valve opening degree is a correct detection of an actual bypass valve opening degree by detecting the bypass valve opening degree with two bypass valve opening degree sensors 25b and 25c. For example, if there is a large difference between the first bypass valve opening degree value detected by the first bypass valve opening degree sensor 25b and the second bypass valve opening degree value detected by the second bypass valve opening degree sensor 25c, then the boost pressure diagnostic apparatus can determine that one of the bypass valve opening degree sensors 25b or 25c is malfunctioning.

In addition to receiving detection signals from the air flow meter 14, the atmospheric pressure sensor 18 and the boost pressure sensor 21, the control unit 30 also receives detection signals from a variety of other sensors, including a crank angle sensor 26, an accelerator position sensor 27 and a coolant temperature sensor 28. The crank angle sensor 26 is configured to detect a crank angle position and output a crank angle position signal that is indicative of an engine rotational speed (engine speed). The accelerator position sensor 27 configured to detect a depression amount (accelerator position) of an accelerator pedal operated by a driver and output an accelerator pedal depression amount signal. The coolant temperature sensor 28 configured to detect a coolant temperature of the engine 1 and output a coolant temperature signal. The control unit 30 also receives information related to a voltage of the onboard battery (not shown) and output a voltage signal. Based on the detection signals received by the control unit 30, the control unit 30 determines and controls a fuel injection quantity, a fuel injecting timing and an ignition timing of the engine 1. Also based on the detection signals received by the control unit 30, the control unit 30 determines and controls a throttle valve opening degree, a bypass valve opening degree and a drive/stop status of the forced induction device 19 (engage/release status of the electromagnetic clutch 23).

The control unit 30 preferably includes a microcomputer with a various control program that controls the engine 1 as well as a boost pressure diagnostic program as discussed below. The control unit 30 can also include other conventional components such as an input interface circuit, an output interface circuit, and storage devices such as a ROM (Read Only Memory) device and a RAM (Random Access Memory) device. The microcomputer of the control unit 30 is programmed to control the operation of the engine 1. The memory circuit stores processing results and control programs such as ones for boost pressure diagnostic program that are run by the processor circuit.

In addition to using a detection value of the boost pressure sensor 21, the boost pressure diagnostic apparatus uses output values from one or both of the throttle valve opening degree sensor 15b and 15c and from one or both the bypass valve opening degree sensors 25b and 25c to determine if an abnormal pressure exists between the forced induction device 19 and a throttle valve 15. As a result, even if the detection value of the boost pressure sensor 21 contains electrical noise, a determination regarding whether the pressure between the forced induction device 19 and the throttle valve 15 is abnormal and has exceeded an appropriate range can be accomplished accurately and as quickly as possible.

As used herein, the term "boost region" refers to a situation in which the electromagnetic clutch 23 is engaged and the forced induction device 19 is driven. On the other hand, the term "non-boost region" refers to a situation in which the electromagnetic clutch 23 is released and the forced induction device 19 is not driven. The boost region and the non-boost region are determined in advance as preset operating regions that are based on engine speed and target torque for a particular vehicle. More specifically, the non-boost region is an operating region in which a target torque is smaller than a maximum torque obtainable from the engine 1 for a particular vehicle when the electromagnetic clutch 23 is released. Meanwhile, the boost region is an operating region in which the target torque is larger than a maximum torque obtainable from the engine 1 for a particular vehicle when the electromagnetic clutch 23 is released. In the boost region with the throttle valve 15 fully open, the torque of the engine 1 is controlled by the control unit 30 controlling the bypass valve opening degree. Meanwhile, in the non-boost region with the bypass valve 25 fully open, the torque of the engine 1 is controlled by the control unit 30 controlling the throttle valve opening degree. The target torque is calculated based on, for example, a detection vehicle speed and a detected accelerator depression amount or value from the accelerator position sensor 27. Alternatively, the detected accelerator depression amount can be detected by a throttle valve opening degree.

When excessive boost occurs and the pressure between the forced induction device 19 and the throttle valve 15 becomes excessively high, the control unit 30 increases the bypass valve opening degree. Also, if the forced induction device 19 is being driven (i.e., the electromagnetic clutch 23 is engaged) during excessive boost and the excessively high pressure between the forced induction device 19 and the throttle valve 15, the control unit 30 further stops driving the forced induction device 19 (i.e., the electromagnetic clutch 23 is released) such that the control unit 30 controls the pressure between the forced induction device 19 and the throttle valve 15 to a pressure level that is not excessive. Although it is possible for the control unit 30 to determine if the pressure between the forced induction device 19 and the throttle valve 15 is excessively high (i.e., if the pressure between the forced induction device 19 and the throttle valve 15 is abnormal) based solely on the detection value of the boost pressure sensor 21, the control unit 30 of the boost pressure diagnostic apparatus of the illustrated embodiment takes into account the possibility that there could be electrical noise in the detection value of the boost pressure sensor 21. In particular, the control unit 30 takes into account the possibility of electrical noise in the detection value of the boost pressure sensor 21 by taking into account the throttle valve opening degree and the bypass valve opening degree when determining if the pressure between the forced induction device 19 and the throttle valve 15 is excessively high.

Figure 2:
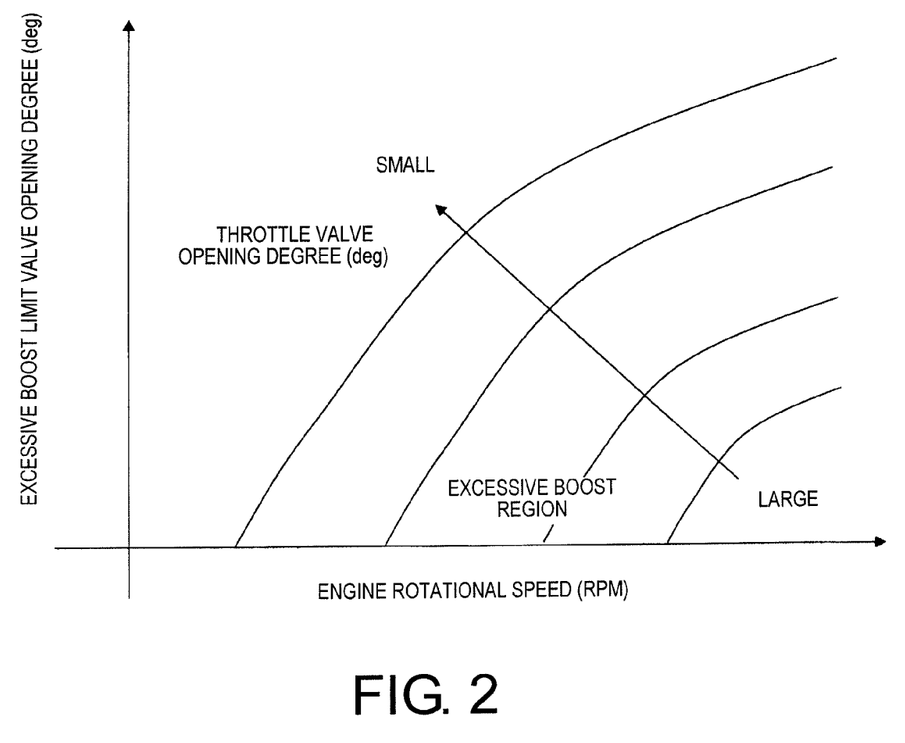
FIG. 2 is an excessive boost limit valve opening degree map used by the boost pressure diagnostic apparatus in accordance with the illustrated embodiment

More specifically, the boost pressure diagnostic apparatus uses an excessive boost limit valve opening degree map like that shown in FIG. 2 to calculate an excessive boost limit valve opening degree of the bypass valve 25 based on the rotational speed (engine speed) of the engine 1 and the throttle valve opening degree detected by the first throttle valve opening degree sensor 15b. The excessive boost limit valve opening degree map can be preset in advance for a particular vehicle as shown in FIG. 2. If the bypass valve opening degree detected by the first bypass valve opening degree sensor 25b is smaller than the excessive boost limit valve opening degree and the detection value, i.e., boost pressure, detected by the boost pressure sensor 21 is larger than a prescribed pressure A (prescribed value), then the pressure between the forced induction device 19 and the throttle valve 15 is determined to be excessively high. The excessive boost limit valve opening degree of the bypass valve 25 is a limit value of the bypass valve opening degree for ensuring that the pressure between the forced induction device 19 and the throttle valve 15 does not exceed a preset prescribed value (the prescribed pressure A) for a given throttle valve opening degree and a given engine speed that exist. If the bypass valve opening degree is smaller than the excessive boost limit opening degree, then the pressure between the forced induction device 19 and the throttle valve 15 is excessively high (higher than the prescribed pressure A).

Figure 3A:
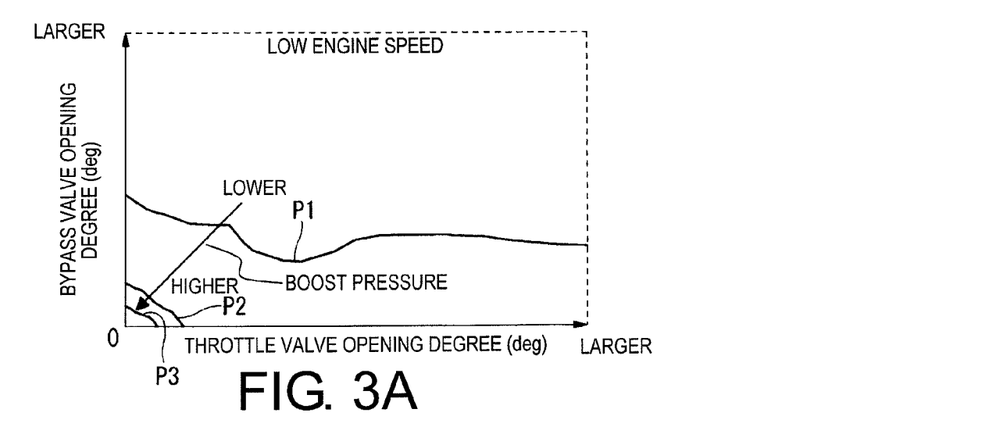
FIG. 3A is a simple plot illustrating correlation relationships among a throttle valve opening, a bypass valve opening and a pressure between a forced induction device and a throttle valve for different engine rotational speeds where the engine rotational speed is low.
Figure 3B:
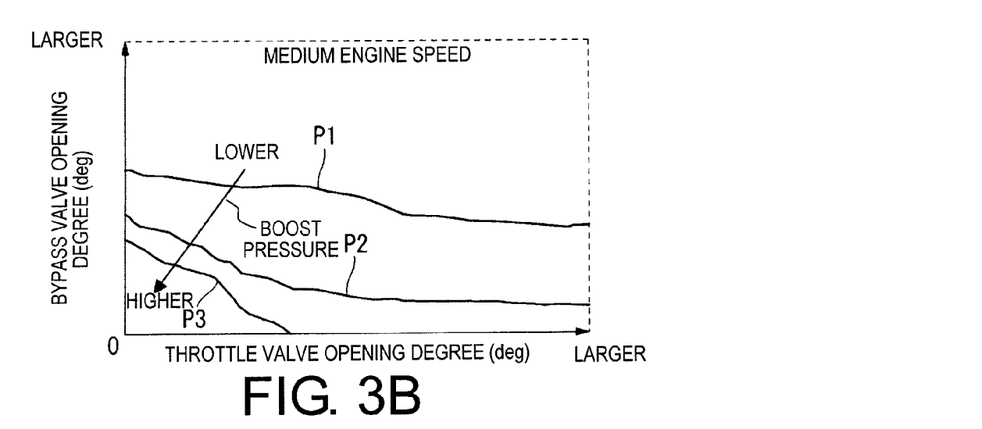
FIG. 3B is a simple plot illustrating correlation relationships among a throttle valve opening, a bypass valve opening and a pressure between a forced induction device and a throttle valve for different engine rotational speeds where the engine rotational speed is medium.
Figure 3C:
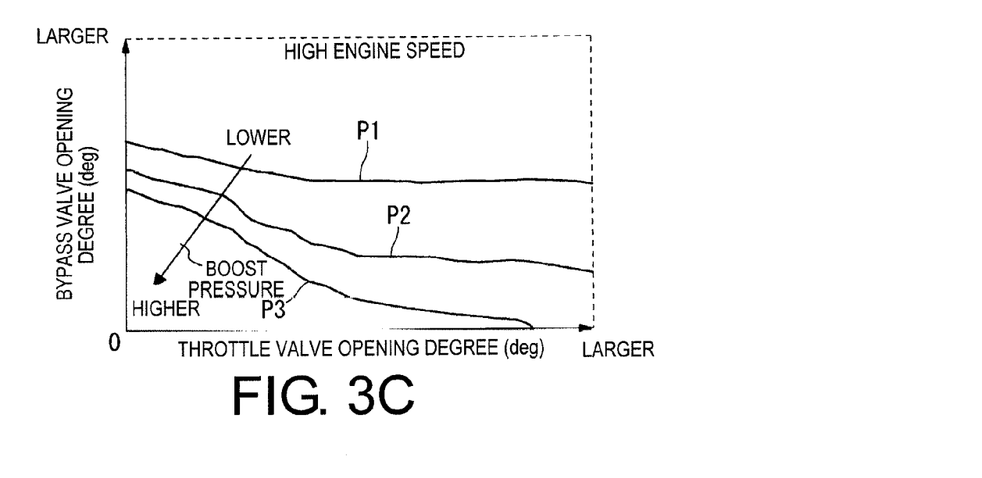
FIG. 3C is a simple plot illustrating correlation relationships among a throttle valve opening, a bypass valve opening and a pressure between a forced induction device and a throttle valve for different engine rotational speeds where the engine rotational speed is high.

The excessive boost limit valve opening degree map is configured to take into account whether the forced induction device 19 is driven or stopped. Also the excessive boost limit valve opening degree map sets the excessive boost limit valve opening degree such that the excessive boost limit valve opening degree increases as the throttle valve opening degree decreases and the rotational speed (engine speed) of the engine 1 increases. Since the determination of whether to drive or stop the forced induction device 19 is made based on the rotational speed of the engine and the throttle valve opening degree, the pressure between the forced induction device 19 and the throttle valve 15 is determined based on the throttle valve opening degree, the bypass valve opening degree, and the rotational speed of the engine 1. Thus, as shown in FIG. 3, a correlation diagram is calculated experimentally in advance for different engine speeds. This correlation diagram of FIG. 3 expresses a relationship among the throttle valve opening degree, the bypass valve opening degree, and the pressure between the forced induction device 19 and the throttle valve 15 (i.e., the boost pressure). The correlation diagrams for each of the engine speeds can then be combined to obtain the aforementioned excessive boost limit opening degree map. As shown in FIG. 3, the boost pressure increases with decreasing throttle valve opening degree, decreasing bypass valve opening degree, and increasing engine speed. Also, the lines P1, P2 and P3 shown in FIG. 3 are lines of constant boost pressure satisfying the relationship P1<P2<P3, where P3 is comparatively the highest boost pressure.

More specifically, the boost pressure between the forced induction device 19 and the throttle valve 15 at a given engine speed is determined by the throttle valve opening degree and the bypass valve opening degree. Therefore, when the boost pressure between the forced induction device 19 and the throttle valve 15 is at a given value, the bypass valve opening degree can be increased if the throttle valve opening degree is decreased, and the throttle valve opening degree can be increased if the bypass valve opening degree is decreased. Also, as the rotational speed of the engine 1 increases, the throttle valve opening degree and the bypass valve opening degree required for setting the boost pressure between the forced induction device 19 and the throttle valve 15 to a given value also become comparatively larger. In other words, when the pressure between the forced induction device 19 and the throttle valve 15 is excessively high (i.e., higher than the prescribed pressure A), the throttle valve opening degree can assume a value within a prescribed range (i.e., within a prescribed throttle valve opening degree region). Similarly, when the pressure between the forced induction device 19 and the throttle valve 15 is excessively high (higher than the prescribed pressure A), the bypass valve opening degree can assume a value within a prescribed range (i.e., within a prescribed bypass valve opening degree region). The prescribed bypass valve opening degree region is a prescribed range in which the bypass valve opening degree can lie while keeping the pressure between the forced induction device 19 and the throttle valve 15 excessively high (higher than the prescribed opening degree). Thus, the prescribed range for the throttle valve prescribed opening degree region becomes larger as the bypass valve opening degree decreases. Also the prescribed range (prescribed opening degree region) is larger at higher engine speeds than at lower engine speeds. Meanwhile, the prescribed range (prescribed bypass valve opening degree region) in which the bypass valve opening degree can lie while keeping the pressure between the forced induction device 19 and the throttle valve 15 excessively high (higher than the prescribed opening degree) becomes larger as the throttle valve opening degree decreases and is larger at higher engine speeds than at lower engine speeds.

In this embodiment, if the first and second throttle valve opening degrees detected by the first and second throttle valve opening degree sensors 15b and 15c differ by an amount larger than a throttle valve opening degree sensor warning determination value, then the pressure between the forced induction device 19 and the throttle valve 15 will be determined to be excessively high when the detection value, i.e., the boost pressure, detected by the boost pressure sensor 21 is larger than the prescribed pressure A (prescribed value). Also if the first and second bypass valve opening degrees detected by the first and second bypass valve opening degree sensors 25b and 25c differ by an amount larger than a bypass valve opening degree sensor warning determination value, then the pressure between the forced induction device 19 and the throttle valve 15 will be determined to be excessively high when the detection value, i.e., the boost pressure, detected by the boost pressure sensor 21 is larger than the prescribed pressure A (prescribed value).

Figure 4:
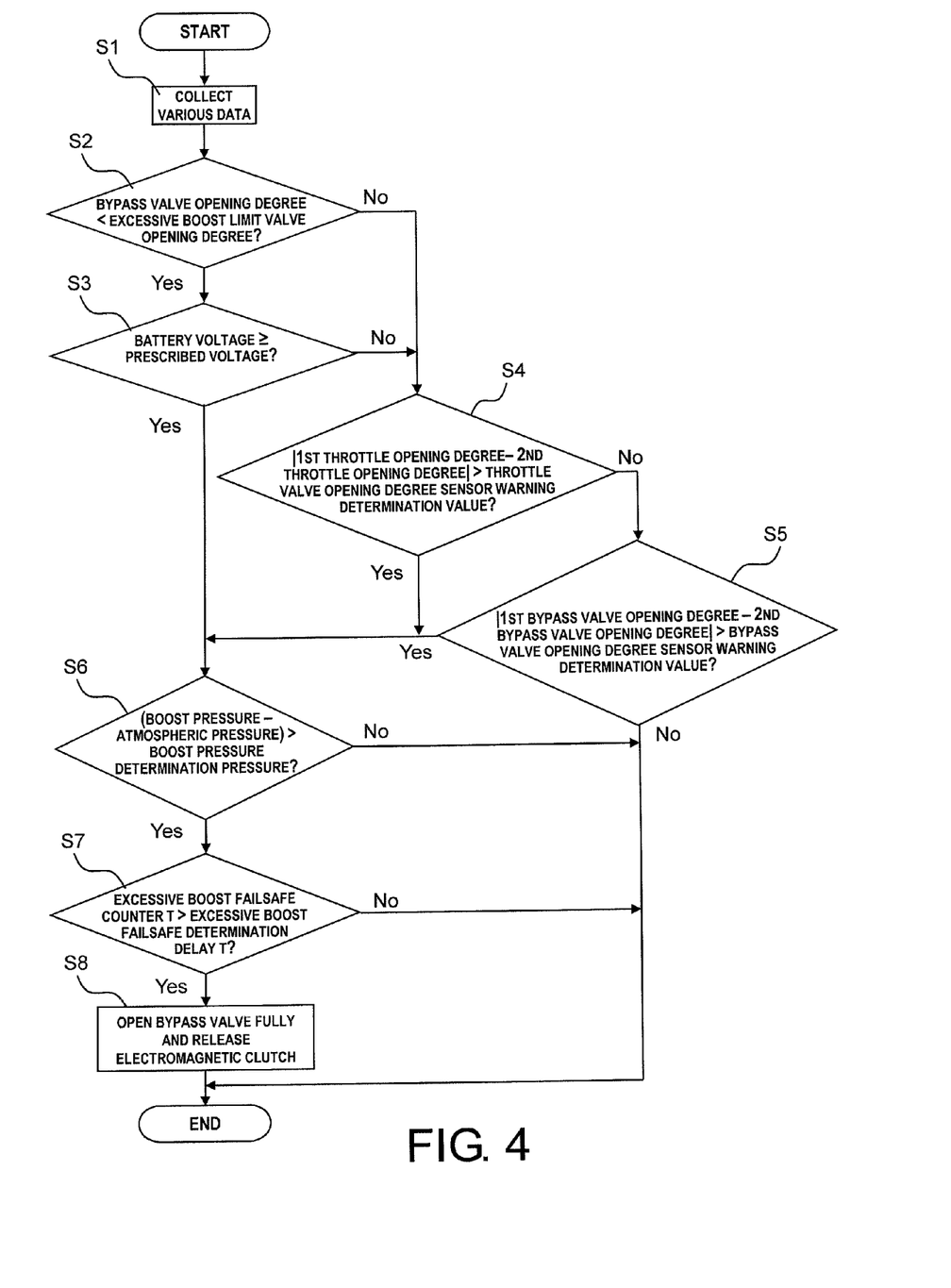
FIG. 4 is a flowchart showing control steps executed by the control unit of the boost pressure diagnostic apparatus for determining a boost pressure of a force induction device (e.g., a supercharger).

FIG. 4 is a flowchart showing control steps executed by the control unit 30 in relation to determining a status of the boost pressure and controlling the engagement and release of the electromagnetic clutch 23 and the opening degree of the bypass valve 25 in response to the status of the boost pressure. These control steps are repeatedly executed by the control unit 30 once per prescribed time period (e.g., 10 ms).

In step S1, the control unit 30 receives various information including, but not limited to, the engine speed, the first and second throttle valve opening degrees, and the first and second bypass valve opening degrees from the various sensors.

In step S2, the control unit 30 uses an excessive boost limit opening degree map (FIG. 2) to calculate an excessive boost limit opening degree based on the throttle valve opening degree and the rotational speed of the engine 1. Based on this calculation, the control unit 30 determines if the bypass valve opening degree is smaller than an excessive boost limit valve opening degree. If the bypass valve opening degree is smaller than the excessive boost limit valve opening degree, then the control unit 30 proceeds to step S3. If the bypass valve opening degree is equal to or larger than the excessive boost limit valve opening degree, then the control unit 30 proceeds to step S4.

Although in this embodiment the throttle valve opening degree used to calculate the excessive boost limit valve opening degree is the throttle valve opening degree detected by the first throttle valve opening degree sensor 15b, it is also possible to use the throttle valve opening degree detected by the second throttle valve opening degree sensor 15c or an average value (arithmetic mean) of the throttle valve opening degrees detected by the first and second throttle valve opening degree sensors 15b and 15c. Similarly, although in this embodiment the bypass valve opening degree used in the calculation of the excessive boost limit valve opening degree is the bypass valve opening degree detected by the first bypass valve opening degree sensor 25b, it is also possible to use the bypass valve opening degree detected by the second bypass valve opening degree sensor 25c or an average value (arithmetic mean) of the first and second bypass valve opening degrees detected by the first and second bypass valve opening degree sensors 25b and 25c.

In step S3 the control unit 30 determines if the electromagnetic clutch 23 is engaged (i.e., the electromagnetic clutch 23 is determined to be engaged if the engine 1 is determined to be operating in a boost region based on a target torque and an engine speed). Also the control unit 30 determines if a voltage of the onboard battery is equal to or larger than a preset prescribed voltage (e.g., 11 V). If the battery voltage is equal to or larger than the prescribed voltage, then the control unit 30 proceeds to step S6. If the battery voltage is smaller than the prescribed voltage, then the control unit 30 proceeds to step S4.

In step S4, the control unit 30 determines if the absolute value of a value obtained by subtracting the throttle valve opening degree detected by the second throttle valve opening degree sensor 15c from the throttle valve opening degree detected by the first throttle valve opening degree sensor 15b is larger than a preset throttle valve opening degree sensor warning determination value. If so, then the control unit 30 proceeds to step S6. If not, then the control unit 30 proceeds to step S5.

When operating conditions are such that the control unit 30 proceeds from S4 to S6, at least one of the two throttle valve opening degree sensors 15b and 15c is not detecting an actual throttle valve opening correctly and the detected throttle valve opening degree is less reliable than when both of the throttle valve opening degree sensors 15b and 15c are detecting the actual throttle valve opening degree correctly. That is, in step S4, the control unit 30 can determine if a malfunction of the throttle valve opening degree sensors 15b and 15c is occurring.

In step S5, the control unit 30 determines if the absolute value of a value obtained by subtracting the second bypass valve opening degree detected by the second bypass valve opening degree sensor 25c from the first bypass valve opening degree detected by the first bypass valve opening degree sensor 25b is larger than a preset bypass valve opening degree sensor warning determination value. If so, then the control unit 30 proceeds to step S6. If not, then the control unit 30 clears (sets to zero) an excessive boost failsafe counter T (ms) (explained later) and ends the current cycle of the routine. When operating conditions are such that the control unit 30 proceeds from S5 to S6, at least one of the bypass valve opening degree sensors 25b and 25c is not detecting an actual bypass valve opening degree correctly and the detected bypass valve opening degree is less reliable than when both of the bypass valve opening degree sensors 25b and 25c are detecting the actual bypass valve opening degree correctly. That is, in step S5, the control unit 30 can determine if a malfunction of the bypass valve opening degree sensors 25b and 25c is occurring.

In step S6, the control unit 30 determines if a relative pressure value obtained by subtracting an atmospheric pressure detected by the atmospheric pressure sensor 18 from the boost pressure detected by the boost pressure sensor 21 is larger than a preset boost pressure determination pressure. If the relative pressure is larger, then the control unit 30 increments the excessive boost failsafe counter T (ms) and proceeds to step S7. If not, then the control unit 30 clears (zeroes) the excessive boost failsafe counter T (ms) and ends the current cycle of the routine.

In step S7, the control unit 30 determines if the excessive boost failsafe counter T is larger than a preset excessive boost failsafe determination delay t (ms). If so, then the control unit 30 proceeds to step S8. If not, then the control unit 30 ends the current cycle of the routine. In other words, in step S7, the control unit 30 determines if the pressure between the forced induction device 19 and the throttle 15 is excessively high and proceeds to step S8 if it determines that the pressure between the forced induction device 19 and the throttle 15 is excessively high.

In step S8, the control unit 30 turns off an electric power supply to the actuator 25a of the bypass valve 25 such that the bypass valve 25 is fully open. The control unit 30 also releases the electromagnetic clutch 23 such that the pressure between the forced induction device 19 and the throttle valve 15, i.e., the boost pressure, is lowered.

In step S8, the control unit 30 also determines if the number of times the excessive boost failsafe counter T has been determined to be larger than the preset excessive boost failsafe determination delay t (ms) during a single session of operation (i.e., a single period from when the ignition is turned on until the ignition is turned off) is equal to or larger than a preset excessive boost abnormality determination count C. If the number of times is larger than the determination count C, then the control unit 30 illuminates a warning lamp installed in an instrument panel of the vehicle in which the engine 1 is installed. The warning lamp is installed in a position where a driver can see it and serves to inform the driver that the boost pressure is abnormal (i.e., the pressure between the forced induction device 19 and the throttle valve 15 is abnormal). Once the warning lamp is illuminated, it continues to shine during operation of the vehicle until the vehicle is inspected at a repair shop or the like.

When, for example, the throttle valve 15 (or the bypass valve 25) malfunctions and enters a prescribed opening degree region and the boost pressure becomes excessively high, the control unit 30 can accurately determine that a boost pressure abnormality exists by executing the steps S2→S3→S6→S7 of the flowchart explained above.

Meanwhile, if there is electrical noise in the detection value of the boost pressure sensor 21, then in step S2 the control unit 30 will determine that the bypass valve opening degree is equal to or larger than the excessive boost limit valve opening degree and will not determine that a boost pressure abnormality exists. Also, although the control unit 30 can proceed through steps S4 and S5 to step S6 after determining in step S2 that the bypass valve opening degree is equal to or larger than the excessive boost limit valve opening degree, this will only occur if any of the throttle valve opening degree sensors 15b and 15c and the bypass valve opening degree sensors 25b and 25c is malfunctioning.

There are situations in which although the throttle valve 15 has failed and the throttle valve opening degree has entered a prescribed opening degree region, the fact that the throttle valve opening degree entered the prescribed opening degree region because at least one of the throttle valve opening degree sensors 15b and 15c failed cannot be detected. In such a situation, a failure of the throttle valve opening degree sensor 15b or 15c can be determined in step S4 even if the throttle valve opening degree is not in the prescribed opening degree region. Additionally, if the boost pressure is abnormal, then the abnormal boost pressure can be accurately recognized by following the steps S2→S4→S6→S7 of the flowchart.

There are situations in which the bypass valve 25 fails and the bypass valve opening degree enters a prescribed opening degree region, but the fact that the bypass valve opening degree entered the prescribed opening degree region because at least one of the bypass valve opening degree sensors 25b and 25c failed cannot be detected. In such a situation, a failure of the bypass valve opening degree sensor 25b or 25c can be determined in step S5 even if the bypass valve opening degree is not in the prescribed opening degree region. Additionally, if the boost pressure is abnormal, then the abnormal boost pressure can be accurately recognized by following the steps S2→S4→S5→S6→S7 of the flowchart.

As explained heretofore, in addition to using a detection value of the boost pressure sensor 21, the present invention uses output values from the throttle valve opening degree sensors 15b and 15c and the bypass valve opening degree sensors 25b and 25c to determine if an excessively high pressure exists between the forced induction device 19 and the throttle valve 15. As a result, even if the detection value of the boost pressure sensor 21 contains electrical noise, a determination regarding whether the pressure between the forced induction device 19 and the throttle valve 15 is abnormal and has exceeded an appropriate range can be accomplished accurately and as quickly as possible.

When the force induction pressure is determined to be excessively high, the bypass valve 25 is opened fully and the electromagnetic clutch 23 is released if the forced induction device 19 is being driven. As a result, a situation in which the engine 1 continues to operate with the boost pressure excessively high can be avoided and the parts of the air induction system can be reliably protected.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not change their basic function. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An internal combustion engine boost pressure diagnostic apparatus comprising:
    a boost pressure sensor configured to detect a pressure between a forced induction device and a throttle valve;
    a throttle valve opening degree sensor configured to detect a throttle valve opening degree of the throttle valve;
    a bypass valve opening degree sensor configured to detect a bypass valve opening degree of a bypass valve provided in a bypass passage that is parallel to the forced induction device to allow intake air to circumvent the forced induction device; and
    a control unit configured to determine that the pressure between the forced induction device and the throttle valve is abnormal upon the boost pressure sensor detecting the pressure being equal to or larger than a prescribed value, the throttle valve opening degree sensor detecting the throttle valve opening degree being in a prescribed throttle valve opening degree region, and the bypass valve opening degree sensor detecting the bypass valve opening degree being in a prescribed bypass valve opening degree region;
    the bypass valve opening degree sensor including first and second bypass valve opening degree sensors that are configured to detect the bypass valve opening degree of the bypass valve, and
    the control unit being further configured to receive first and second bypass valve opening degrees from the first and second bypass valve opening degree sensors and determine that the pressure between the forced induction device and the throttle valve is above a predetermined pressure upon determining that the first and second bypass valve opening degrees differ by an amount larger than a bypass valve opening degree sensor warning determination value.

2. The internal combustion engine boost pressure diagnostic apparatus according to claim 1, wherein
    the control unit is further configured to set the prescribed throttle valve opening degree region to become larger as the bypass valve opening degree becomes smaller; and
    the control unit is further configured to set the prescribed bypass valve opening degree region to become larger as the throttle valve opening degree becomes smaller.

3. The internal combustion engine boost pressure diagnostic apparatus according to claim 2, wherein
    the control unit is further configured to revise both the prescribed throttle valve opening degree region and the prescribed bypass valve opening degree region in accordance with a detected engine rotational speed.

4. The internal combustion engine boost pressure diagnostic apparatus according to claim 3, wherein
    the control unit is further configured to set the prescribed throttle valve opening degree region and the prescribed bypass valve opening degree region to be larger as the engine rotational speed becomes higher.

5. The internal combustion engine boost pressure diagnostic apparatus according to claim 1, wherein
    the control unit is further configured to revise both the prescribed throttle valve opening degree region and the prescribed bypass valve opening degree region in accordance with a detected engine rotational speed.

6. The internal combustion engine boost pressure diagnostic apparatus according to claim 5, wherein
    the control unit is further configured to set the prescribed throttle valve opening degree region and the prescribed bypass valve opening degree region to be larger as the engine rotational speed becomes higher.

7. The internal combustion engine boost pressure diagnostic apparatus according to claim 1, wherein
    the throttle valve opening degree sensor includes first and second throttle valve opening degree sensors that are configured to detect the throttle valve opening degree of the throttle valve, and
    the control unit is further configured to receive first and second throttle valve opening degrees from the first and second throttle valve opening degree sensors and determine that the pressure between the forced induction device and the throttle valve is above a predetermined pressure upon determining that the first and second throttle valve opening degrees differ by an amount larger than a throttle valve opening degree sensor warning determination value.

8. The internal combustion engine boost pressure diagnostic apparatus according to claim 1, wherein
    the throttle valve opening degree sensor is configured to detect the throttle valve opening degree within a range of opening degrees of the throttle valve including an intermediate range of throttle valve opening degrees between a fully open position of the throttle valve and a fully closed position of the throttle valve.

9. The internal combustion engine boost pressure diagnostic apparatus according to claim 1, wherein
    the bypass valve opening degree sensor is configured to detect the bypass valve opening degree within a range of opening degrees of the bypass valve including an intermediate range of bypass valve opening degrees between a fully open position of the bypass valve and a fully closed position of the bypass valve.

10. The internal combustion engine boost pressure diagnostic apparatus according to claim 8, wherein
    the bypass valve opening degree sensor is configured to detect the bypass valve opening degree within a range of opening degrees of the bypass valve including an intermediate range of bypass valve opening degrees between a fully open position of the bypass valve and a fully closed position of the bypass valve.

11. The internal combustion engine boost pressure diagnostic apparatus according to claim 1, wherein
    the boost pressure sensor is configured to detect the pressure within a conduit between the forced induction device and the throttle valve with the throttle valve being disposed in the conduit downstream of the forced induction device in a direction toward an intake passage of the internal combustion engine; and the control unit is configured to determine that the pressure within the conduit between the forced induction device and the throttle valve is abnormal.

12. The internal combustion engine boost pressure diagnostic apparatus according to claim 10, wherein the boost pressure sensor is configured to detect the pressure within a conduit between the forced induction device and the throttle valve with the throttle valve being disposed in the conduit downstream of the forced induction device in a direction toward an intake passage of the internal combustion engine; and the control unit is configured to determine that the pressure within the conduit between the forced induction device and the throttle valve is abnormal.

13. The internal combustion engine boost pressure diagnostic apparatus according to claim 11, wherein the bypass passage is parallel to the forced induction device to allow intake air to circumvent the forced induction device and enter the conduit downstream of the forced induction device and upstream of the throttle valve.

14. The internal combustion engine boost pressure diagnostic apparatus according to claim 12, wherein the bypass passage is parallel to the forced induction device to allow intake air to circumvent the forced induction device and enter the conduit downstream of the forced induction device and upstream of the throttle valve.

* * * * *